US007048446B2

(12) United States Patent
Rondeau et al.

(10) Patent No.: US 7,048,446 B2
(45) Date of Patent: May 23, 2006

(54) CONNECTOR FOR IMPACT MOUNTED BUNDLED OPTICAL FIBER DEVICES

(75) Inventors: Michel Y. Rondeau, Reno, NV (US); Israel M. Miranda, San Jose, CA (US); Alpha F. Diallo, Davis, CA (US)

(73) Assignee: Valdor Fiber Optics, Inc., Hayward, CA (US)

( * ) Notice: Subject to any disclaimer, the term of this patent is extended or adjusted under 35 U.S.C. 154(b) by 91 days.

(21) Appl. No.: 10/782,722

(22) Filed: Feb. 18, 2004

(65) Prior Publication Data
US 2004/0184739 A1 Sep. 23, 2004

Related U.S. Application Data

(63) Continuation-in-part of application No. 10/313,977, filed on Dec. 6, 2002, now abandoned.

(51) Int. Cl.
*G02B 6/40* (2006.01)
(52) U.S. Cl. ........................................ 385/54; 385/147
(58) Field of Classification Search ............ 385/50–59, 385/76–78, 80–94, 147
See application file for complete search history.

(56) References Cited

U.S. PATENT DOCUMENTS

| 5,216,735 | A | * | 6/1993 | Rondeau | ....................... 385/78 |
| 5,502,784 | A | * | 3/1996 | Rondeau | ....................... 385/66 |
| 6,371,660 | B1 | * | 4/2002 | Roehrs et al. | ................. 385/59 |
| 2002/0097964 | A1 | * | 7/2002 | Roehrs et al. | ................. 385/59 |

* cited by examiner

*Primary Examiner*—Akm Enayet Ullah
(74) *Attorney, Agent, or Firm*—Robert O. Guillet; Intellectual Property Law Offices

(57) ABSTRACT

In the connector of the present invention two impact mounted seven optical fiber ferrules are aligned through the alignment of the central optical fiber and the alignment of at least one of the outer optical fibers in the ferrules. Due to the symmetrical, repeatable orientation of the optical fibers in the ferrule, all of the remaining optical fibers will automatically be aligned when the central optical fiber and one of the outer optical fibers are aligned, thus greatly simplifying the alignment process for the plurality of optical fibers within the connector of the present invention. In a preferred embodiment of the present invention each of the seven optical fibers is color coded. The optical fibers within the transmitting and receiving optical fiber bundles are arranged in a mirror image orientation, such that light signals transmitted on a particular colored optical fiber is received within a similarly colored optical fiber.

10 Claims, 3 Drawing Sheets ical fiber devices.

CONNECTOR FOR IMPACT MOUNTED BUNDLED OPTICAL FIBER DEVICES

CROSS REFERENCE TO RELATED APPLICATION

This application is a continuation-in-part application of U.S. patent application Ser. No. 10/313,977 entitled: Impact Mounted Bundled Optical Fiber Devices, filed Dec. 6, 2002 abandoned.

BACKGROUND OF THE INVENTION

1. Field of the Invention

The present invention relates generally to fiber optic devices, and more particularly to connectors for bundled optical fiber devices.

2. Description of the Prior Art

Optical components that utilize bundled optical fibers, as opposed to single optical fibers, can be advantageous in saving valuable space within fiberoptic devices. Additionally, the number of components within a fiberoptic device can be reduced where, for instance, optical signals from multiple optical fibers in a bundle are directed through a single component, such as a connector, to multiple optical fibers in a second bundle.

A problem that exists in the usage of bundled optical fiber devices is in the reliable connection of the bundled optical fibers together utilizing a connective device. To achieve signal transmission, each optical fiber within a transmitting optical fiber bundle must be accurately aligned with a receiving optical fiber in a receiving optical fiber bundle. To achieve this alignment, the optical fibers in the transmitting and receiving bundles must be symmetrically aligned in a fixed orientation. The impact mounted optical fiber bundles utilized in the connector of the present invention overcome this problem, and provide for a repeatable manufacturing of such bundled optical fiber devices, wherein the location of each of the optical fibers within the bundle is symmetrical, fixed and can be repeatably manufactured from device to device.

SUMMARY OF THE INVENTION

In the present invention, bundles of seven of optical fibers are disposed within a holder, such as a ferrule, and the tip of the ferrule is deformed inwardly by an impact mounting device to symmetrically hold the seven bundled fibers together. The impact mounted bundled optical fiber devices may be repeatably, accurately manufactured, and devices that utilize these impact mounted bundled optical fiber devices may be reliably created. In the connector of the present invention two impact mounted optical fiber bundles are aligned through the alignment of the central optical fiber and the alignment of one of the outer optical fibers in the bundle. Due to the symmetrical, repeatable orientation of the optical fibers in the bundle, all of the remaining optical fibers will automatically be aligned when the central optical fiber and one of the outer optical fibers are aligned, thus greatly simplifying the alignment process for the plurality of optical fibers within the connector of the present invention.

In a preferred embodiment of the present invention, a seven optical fiber connector is described, wherein each of the seven optical fibers is color coded. The optical fibers within the transmitting and receiving optical fiber bundles are arranged in a mirror image orientation, such that light signals transmitted on a particular colored optical fiber are received within a similarly colored optical fiber.

It is an advantage of the connector of the present invention that bundled optical fiber devices may be reliably joined together.

It is another advantage of the connector of the present invention that a bundled group of optical fibers are held in a known, repeatable, fixed orientation relative to other optical fibers in the bundle, and two such bundles can be aligned by alignment of a central optical fiber and one outer optical fiber.

It is a further advantage of the connector of the present invention that each bundle of optical fibers within each connector is symmetrically aligned, such that the connection of the bundles of optical fibers is simplified.

These and other features and advantages of the present invention will no doubt become apparent to those skilled in the art upon reviewing the following detailed description which makes reference to the several figures of the drawings.

IN THE DRAWINGS

The following drawings are not made to scale of an actual device, and are provided for illustration of the invention described herein.

DETAILED DESCRIPTION OF THE PREFERRED EMBODIMENTS

Figure 1:
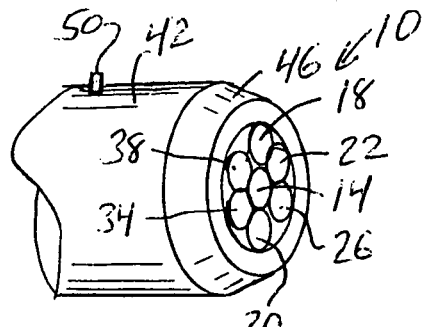
FIG. 1 is a perspective view of the tip portion of an impact mounted seven optical fiber ferrule.
Figure 2:
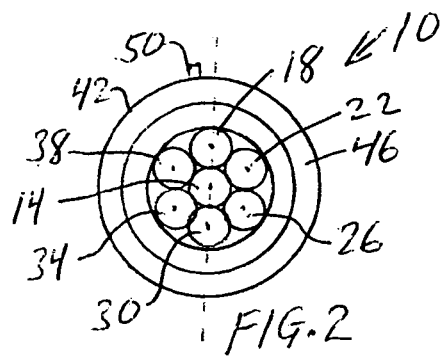
FIG. 2 is a front view of the tip of the impact mounted ferrule depicted in FIG. 1.

A impact mounted bundled seven optical fiber ferrule 10 is depicted in FIGS. 1 and 2 and serves as a reference point for the description of the present invention set forth below. As depicted therein, the seven optical fiber ferrule 10 includes a central optical fiber 14 and six symmetrically disposed outer optical fibers 18, 22, 26, 30, 34 38 that are disposed within a cylindrical ferrule sleeve 42. Inner side surface portions of each of the outer optical fibers 18, 22, 26, 30, 34 and 38 are in frictional contact with the central optical fiber 14 and with two adjacent outer optical fibers. An outer side surface of each of the six outward optical fibers is in frictional contact with a deformed tip 46 of the ferrule material. A registration pin 50 projects radially from the outer surface of the cylindrical ferrule sleeve 42. A device for performing the uniform deformation of the ferrule 42 is taught in U.S. Pat. No. 5,305,406, in which the end of the ferrule is impacted by a cone shaped impact device to uniformly, inwardly deform the end 46 of the ferrule 42 to frictionally engage the outer surface of the optical fibers 18–38.

Significant features of the impact mounted seven optical fiber ferrule depicted in FIGS. 1 and 2 are that the outer six optical fibers 18–38 are symmetrically disposed relative to the central axis of the center optical fiber 14, such that the central axis of each of the six outer optical fibers 18–38 is located at the same radial distance from the central axis of the central optical fiber 14, and that the individual optical fibers are firmly held in place by frictional contact with other optical fibers and with the deformed tip material of the impact mounted ferrule.

Figure 3:
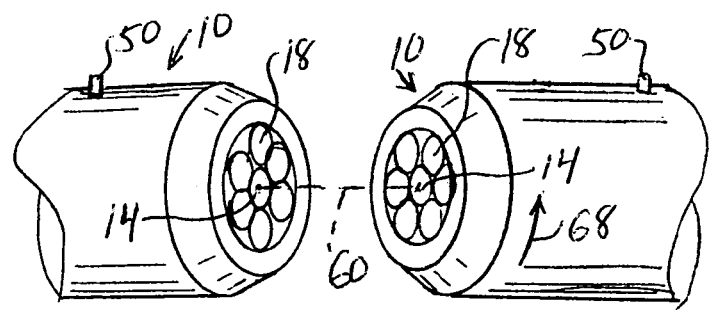
FIG. 3 is a diagram depicting a ferrule interface involving two impact mounted seven optical fiber devices such as are depicted in FIGS. 1 and 2.

FIG. 3 is a diagram that depicts a ferrule interface involving two seven optical fiber ferrules. A first ferrule is shown on the left having a center fiber 14 and six surrounding fibers 18–38 that are impact mounted into a ferrule sleeve 42. The registration pin 50 is shown, projecting radially from the ferrule surface. A second seven optical fiber ferrule is depicted on the right, with a registration pin 50 shown radially projecting from its location on the outer surface of the ferrule. It is significant to note that the location of the projecting registration pins relative to the location of the optical fibers within the two ferrules is somewhat different. This is the expected, typical result of the impact mounting of the bundled optical fibers within a ferrule sleeve. That is, in manufacturing a bundled, seven optical fiber impact mounted ferrule, the seven optical fibers are inserted into the ferrule sleeve in as repeatable an orientation as can be accomplished prior to the impact mounting steps. Subsequently, following the impact mounting steps, there will always be some random movement of the optical fibers relative to the sleeve orientation in the impact mounting steps. As a result, the location of the registration pin 50, relative to a theoretical top dead center location of a particular circumferential optical fiber as is seen in FIG. 2, will vary.

With regard to the alignment of the two seven optical fiber ferrules, it can be seen in FIG. 3 that the central optical fiber 14 of each ferrule 10 is depicted in perfect alignment through central alignment lines 66 that project along the central axis of each central optical fiber 14. However, the six outer optical fibers are not aligned in FIG. 3, as can be seen by comparing the circumferential location of the top fiber of the two ferrules. To align the two ferrules, basically one of the two ferrules, such as the right hand ferrule must be rotated (arrow 68) until the central axis of one of the six outer optical fibers is aligned with the central axis of one of its six optical fibers of the left hand ferrule. Owing to the fixed and symmetrical location of all of the optical fibers in the seven optical fiber ferrules, when the central fiber 14 and one of the outer fibers, such as fibers 18, are both accurately aligned, all of the remaining outer optical fibers 22–38 will also be accurately aligned. As is further described herebelow, the repeatable, accurate alignment of all of the optical fibers in the seven optical fiber ferrule is accomplished through the present invention.

Figure 4:
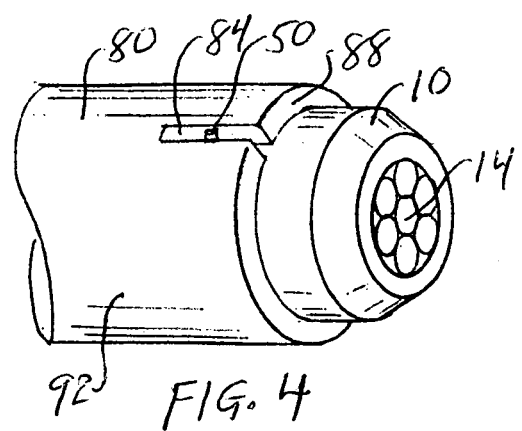
FIG. 4 is a perspective view depicting a seven optical fiber ferrule disposed within a ferrule holding sleeve.

FIG. 4 is a perspective view depicting an initial component of a connector of the present invention. As depicted in FIG. 4, a seven optical fiber ferrule 10, is disposed within a cylindrical ferrule holding sleeve 80. A pin slot 84 is formed in the leading edge 88 of the cylindrical sleeve 80, such that the registration pin 50 of the ferrule resides within the slot 84. The ferrule 10 is slidably engaged within the sleeve 80, such that the pin 50 is movable in an axial direction within the slot 84; however, the disposition of the pin 50 within the slot 84 prevents rotational motion of the ferrule relative to the sleeve 80. The outer surface 92 of the sleeve is preferably smooth and concentric relative to the location of the axis of the central optical fiber 14 of the ferrule 10. That is, the axis of the central optical fiber of the ferrule accurately resides on the central axis of the cylindrical ferrule holding sleeve 80.

Figure 5:
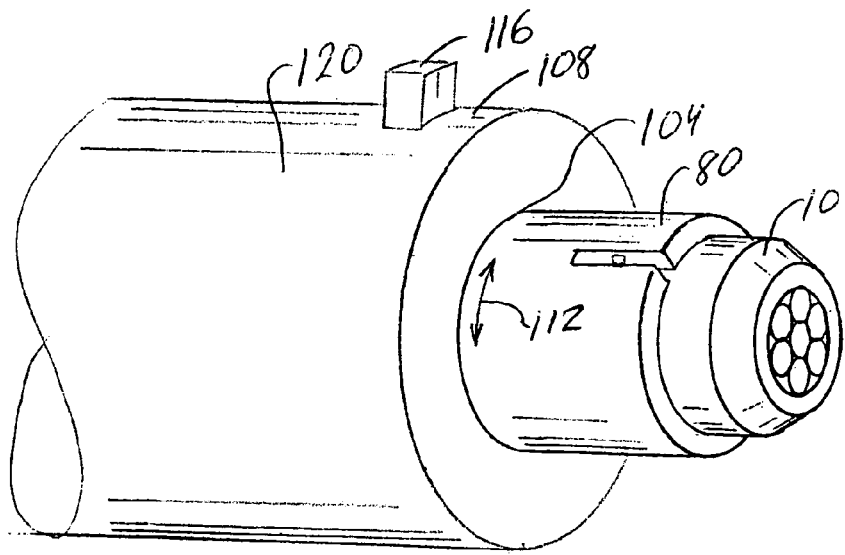
FIG. 5 is a perspective view depicting the device as FIG. 4 disposed within a cylindrical alignment sleeve.

FIG. 5 is a perspective view depicting the tip of a male connector member 100 of the present invention. As depicted therein, a ferrule holding sleeve 80 having a ferrule 10 disposed therewithin (as depicted in FIG. 4 and described hereabove) is disposed within a central bore 104 of a larger cylindrical alignment sleeve 108. The central bore 104 of the alignment sleeve 108 is accurately formed to provide a smooth, snug, slidable engagement of the ferrule holding sleeve 80 within the bore 104, such that the ferrule holding sleeve 80 is free to rotate (see arrow 112) within the bore 104. An alignment member, which is an alignment key 116 in the preferred embodiment, is disposed on the outer surface 120 of the alignment sleeve 108, and it projects radially from the surface 120 of the alignment sleeve 108. The optical fibers 14–38 within the ferrule 10 are to be aligned relative to the alignment key 116, as is next described with the aid of FIG. 6. It is to be understood that other types of alignment members, such as an alignment mark or other device, can be utilized to provide a repeatable orientation for the alignment of the optical fibers relative to the alignment sleeve.

Figure 6:
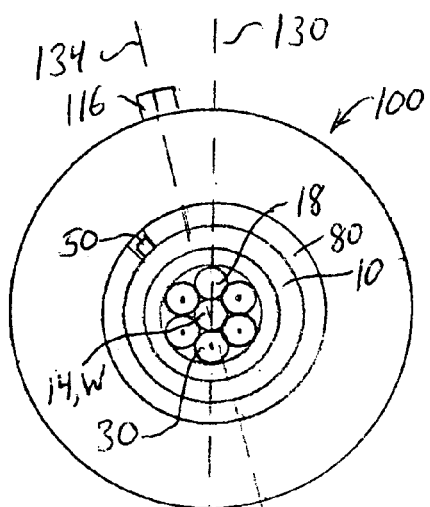
FIG. 6 is an end elevational view of the device depicted in FIG. 5.

FIG. 6 is an end elevational view of the device 100 depicted in FIG. 5. As depicted in FIG. 6, the ferrule 10 with its seven optical fibers is disposed within the ferrule holding sleeve 80, that is then disposed within the bore of the alignment sleeve 108. The key 116 of the alignment sleeve projects radially from the alignment sleeve. It is significant to note that a theoretical optical fiber alignment line 130, shown as a dashed line that diametrically projects through outer optical fiber 18, central optical fiber 14 and outer optical fiber 30, is depicted in FIG. 6 to aid in the description of the present invention. Also, a dashed alignment sleeve alignment line 134 is depicted in FIG. 6, which passes through the central axis of the alignment sleeve 108 and the center of the alignment key 116. As can be seen in FIG. 6, the dashed optical fiber alignment line 130 is angularly rotated relative to the alignment sleeve alignment line 134. The alignment of the ferrule 10 within the alignment sleeve 108 is next described with the aid of FIG. 7.

Figure 7:
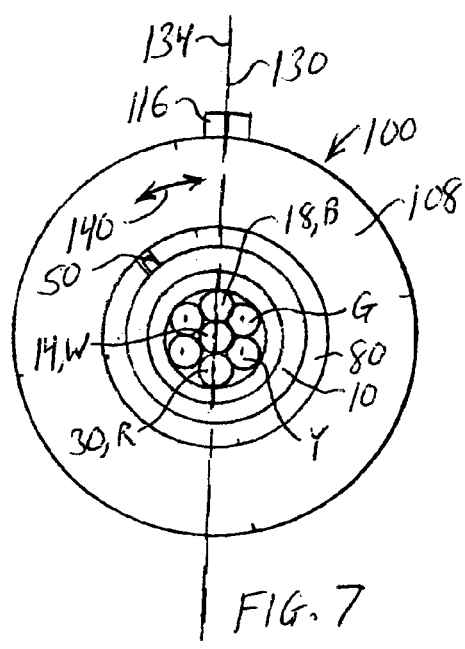
FIG. 7 is an end elevational view depicting the device of FIG. 6 in an aligned orientation.

FIG. 7 is an end elevational view depicting the device of FIG. 6. As depicted in FIG. 7, the ferrule holding sleeve 80 has been rotated (see arrow 140) relative to the alignment sleeve 108 such that the dashed optical fiber alignment line 130 is now aligned with the alignment sleeve alignment line 134. That is, the center of the alignment key is disposed in a top dead center orientation relative to the center axis of one of the outer optical fibers (optical fiber 18 being depicted). This is the desired alignment orientation of the ferrule 10 within the alignment sleeve 108, and the ferrule holding sleeve 80 is next fixed in this orientation relative to the alignment sleeve 108. In the preferred embodiment, physical crimping, or epoxy, or both are next employed at rearward portions (not shown) of the alignment sleeve and ferrule holding sleeve to fixedly engage the alignment sleeve 108 with the ferrule holding sleeve 80, to thereby fix the orientation of the optical fibers 14–38 of the ferrule 10 relative to the alignment key 116.

Due to the small size (less than 0.1 millimeter) of the optical fiber bundle in the ferrule 10, relative to the size (on the order of 5 millimeters) of the alignment sleeve radius, the alignment of the optical fiber alignment line 130 with the alignment key requires some description; it being noted that the figures herein are not drawn to scale of an actual device. In a preferred alignment method, a magnifying video system is utilized to determine the orientation of the ferrule. In this approach, the ferrule holding sleeve 80 with its engaged ferrule 10 is clamped in a holding device and the three diametric optical fibers 18, 14 and 30 are illuminated. When viewed in the magnifying video system, the three illuminated fiber light points provide the directional line of the optical fiber alignment line 130 of the ferrule. The alignment sleeve 108 is engaged in a rotatable chuck and the center of the alignment pin 116 is located in the video system. The alignment sleeve 108 is then rotated relative to the ferrule 10 until the center line of the alignment key 116 is colinear with the optical fiber alignment line 130. When alignment is achieved, the alignment sleeve 108 and the ferrule holding sleeve 80 are fixedly engaged together, such as by physical crimping, or epoxy, or both, as mentioned above.

In a preferred embodiment of the present invention, it is further desirable that each of the seven optical fibers be separately identified, such as by having a different colored outer sheath, such as white (W) for the central optical fiber 14 and a differently colored sheath for each of the outer optical fibers, where the location and orientation of each of the optical fibers is repeatable from device to device. In this configuration, the same colored optical fiber, such as black (B), is repeatably selected to be the optical fiber with which the alignment key is aligned. Other fibers may be green (G), red (R), yellow (Y) etc. Such a repeatable, color coded orientation of the optical fibers within the ferrule, leads to a desired repeatable color coded alignment of the bundled optical fibers in a connector from manufactured device to manufactured device, as is next described with the aid of FIG. 8.

Figure 8:
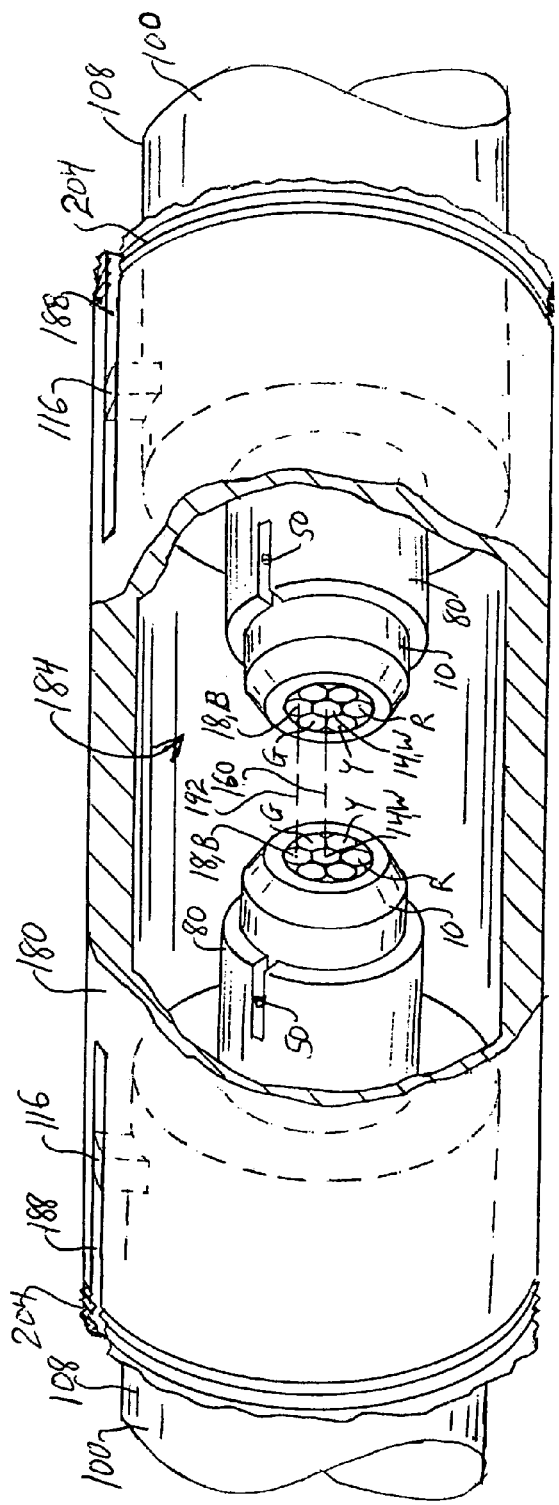
FIG. 8 is a diagram depicting the connector of the present invention including two of the devices depicted in FIG. 7.

FIG. 8 depicts a generalized connector of the present invention for joining two aligned male connector members 100 of FIGS. 5–7 together. As depicted in FIG. 8, a first (left side) male connector member 100, similar to that depicted in FIG. 7, includes a bundled seven optical fiber ferrule 10 in which the central (white) optical fiber 14 is disposed along the central axis 160 of the alignment sleeve 108, and the top (black) optical fiber 18 is rotated to a top dead center orientation relative to the alignment key 116 as depicted in FIG. 7. Similarly, a second (right side) male connector member 100 that is similar to that depicted in FIGS. 5–7 includes a seven optical fiber ferrule 10 having an axially disposed central fiber 14 (white) and a circumferential (black) optical fiber 18 that is located in a top dead center orientation relative to the alignment key 116 of the device 100 (as depicted in FIG. 7). The remaining circumferential optical fibers of the second optical device (right side) are arranged in a color coded orientation relative to each other that mirrors the color coded orientation of the optical fibers in the first optical device (left side); specifically note the mirroring orientation of the green (G) and yellow (Y) optical fibers of the two (left and right) optical devices. A cylindrical connector sleeve 180 having a connector bore 184 into which the alignment sleeves 108 are snugly slidably engagable is provided. The connector sleeve 180 is formed with two aligned connector key slots 188 to assure the desired orientation of the optical fibers relative to each other, when the alignment key 116 of each connector member 100 is inserted into a slot 188. When the two male connector members 100 are thus aligned within the slotted connector sleeve 180, the central axis 192 of the upper optical fibers 18 will be aligned. Additionally, the central axis of all of the other optical fibers will likewise be aligned due to their symmetrical, fixed orientation within their respective ferrule sleeves. As a result, when the two seven optical fiber connector members 100 are joined together, utilizing the connector sleeve 180 of the present invention, an optical signal that is input on any particular colored (such as green) optical fiber of the first (left side) ferrule, will be reliably transmitted on the corresponding (green) colored optical fiber of the second (right side) ferrule.

Figure 9:
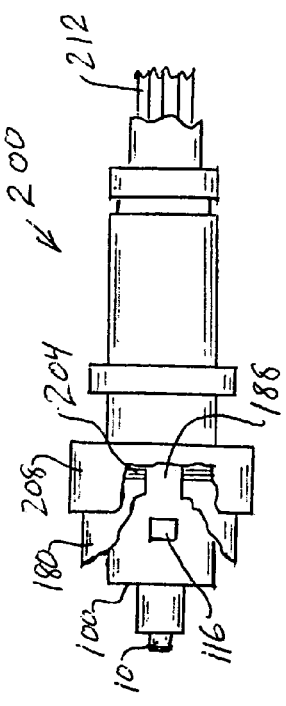
FIG. 9 is a generalized depiction of an FC connector of the present invention.

The connector of the present invention, as depicted in FIG. 8, is a generalized depiction that is meant to apply to the various types of optical fiber connectors known in the industry, such as connectors known as FC, ST, SC, LC, MU and SMA as well as others that may exist or be developed in the future. FIG. 9 is a generalized depiction of an FC connector 200, as is well known to those skilled in the art, depicting a male connector member 100 of the present invention. With reference to both FIGS. 8 and 9, the outer ends of the connector sleeves 180 are formed with threads 204, and an outer internally threaded connector cap 208 is threadably engaged therewith. A fiberoptic cable 212 that contains the seven optical fibers projects from the rearward end of the connector 200. As is well known to those skilled in the art, when a cap 208 is threadably secured on each end of the threads 204 of the connector sleeve 180, the two male connector members 100 are pressed together such that the ends of the optical fibers 18–38 in the tip of the ferrules of each connector 100 are accurately, reliably aligned and pressed together to assure signal transmission therebetween.

As can now be understood, a significant feature of the present invention is that one connector can be utilized to reliably optically join seven pairs of optical fibers together. This results in a significant reduction in the number of connectors that are required to join a plurality of optical fibers together. The repeatable geometry of the seven optical fibers in the impact mounted ferrule facilitates the repeatable orientation of the optical fibers from manufactured device to manufactured device, as well as the assured alignment of all seven of the optical fibers where the alignment of the central optical fiber and only one of the circumferential optical fibers is required to be assured that all of the remaining optical fibers are likewise aligned. Where the sheaths of the optical fibers are color coded, it can be further assured that optical signals inputted to the connector on a particular colored sheath optical fiber, such as green (G), are outputted on a similarly green (G) sheathed optical fiber.

While the present invention has been shown and described with regard to certain preferred embodiments, it is to be understood that those skilled in the art will no doubt develop other and further alterations and modifications related thereto. It is therefore intended that the following claims cover all such alterations and modifications that nevertheless include the true spirit and scope of the present invention.

The invention claimed is:

1. A connector for bundled optical fibers, comprising:
  a first male connector component including:
  a first ferrule holding a plurality of optical fibers, including a central optical fiber and outer, symmetrically disposed optical fibers, said plurality of optical fibers being fixedly held relative to each other within said first ferrule;
  a first alignment sleeve having a central axis thereof, and wherein said central optical fiber of said first ferrule is disposed along said central axis of said first alignment sleeve;
  a first alignment member being formed on said first alignment sleeve;

wherein a central axis of said central optical fiber of said first ferrule and a central axis of at least one said outer optical fibers of said first ferrule are disposed in a straight line alignment with said first alignment member of said first alignment sleeve;

a second male connector component, including:

a second ferrule holding a plurality of optical fibers, including a central optical fiber an outer, symmetrically disposed optical fibers, said plurality of optical fibers being fixedly held relative to each other within said second ferrule;

a second alignment sleeve having a central axis thereof, and wherein said central optical fiber of said second ferrule is disposed along said central axis of said second alignment sleeve;

a second alignment member being formed on said second alignment sleeve;

wherein a central axis of said central optical fiber of said second ferrule and a central axis of at least one said outer optical fibers of said second ferrule are disposed in a straight line alignment with said second alignment member of said second alignment sleeve; and a connector sleeve including a bore for the slidable engagement of said first and second male connector components therewithin, said sleeve including two opposed key slots, wherein an alignment key of said first male connector component and an alignment key of said second male connector component are slidably disposed within said two slots to align said optical fibers within said first and second male connector components together.

2. A connector as described in claim 1 wherein said optical fibers within said first ferrule are color coded, and wherein said optical fibers within said second ferrule are color coded in a mirroring relationship to the color coded optical fibers of said first ferrule.

3. A connector as described in claim 1 wherein said first alignment member comprises said alignment key of said first male connector component, and wherein said alignment key of said first male connector component projects radially from an outer surface of said first alignment sleeve.

4. A connector as described in claim 1 wherein said second alignment member comprises said alignment key of said second male connector component, and wherein said alignment key of said second male connector component projects radially from an outer surface of said second alignment sleeve.

5. A connector as described in claim 1 wherein said first ferrule is engaged within a first ferrule holding sleeve, and said first ferrule holding sleeve is engaged within said first alignment sleeve.

6. A connector component described in claim 1 wherein said second ferrule is engaged within a second ferrule holding sleeve, and said second ferrule holding sleeve is engaged within said second alignment sleeve.

7. A connector as described in claim 5 wherein said first ferrule is slidably engaged within said first ferrule holding sleeve such that rotational movement of said first ferrule relative to said first ferrule holding sleeve is prevented, while axial motion of said first ferrule within said first ferrule holding sleeve is permitted.

8. A connector as described in claim 6 wherein said second ferrule is slidably engaged within said second ferrule holding sleeve such that rotational movement of said second ferrule relative to said second ferrule holding sleeve is prevented, while axial motion of said second ferrule within said second ferrule holding sleeve is permitted.

9. A connector as described in claim 7 wherein said first ferrule holding sleeve is fixedly engaged with said first alignment sleeve.

10. A connector as described in claim 8 wherein said second ferrule holding sleeve is fixedly engaged with said second alignment sleeve.

* * * * *